United States Patent
Hjelmstad et al.

(10) Patent No.: US 8,677,332 B1
(45) Date of Patent: Mar. 18, 2014

(54) EXECUTING MULTIPLE CHILD CODE BLOCKS VIA A SINGLE COMPILED PARENT CODE BLOCK

(75) Inventors: John Hjelmstad, San Francisco, CA (US); Malte Ubl, San Francisco, CA (US)

(73) Assignee: Google Inc., Mountain View, CA (US)

( * ) Notice: Subject to any disclaimer, the term of this patent is extended or adjusted under 35 U.S.C. 154(b) by 45 days.

(21) Appl. No.: 13/556,984

(22) Filed: Jul. 24, 2012

Related U.S. Application Data

(60) Provisional application No. 61/664,673, filed on Jun. 26, 2012.

(51) Int. Cl.
*G06F 9/45* (2006.01)

(52) U.S. Cl.
USPC ............ 717/140; 717/149; 717/150; 717/165

(58) Field of Classification Search
None
See application file for complete search history.

(56) References Cited

U.S. PATENT DOCUMENTS

| | | | |
|---|---|---|---|
| 7,681,178 B1 * | 3/2010 | George et al. ................. | 717/117 |
| 7,865,350 B1 * | 1/2011 | Tocci et al. ..................... | 703/22 |
| 8,191,038 B1 | 5/2012 | Samuel et al. | |
| 8,260,964 B2 | 9/2012 | Marmor | |
| 8,407,584 B1 | 3/2013 | Boodman et al. | |
| 2002/0095666 A1 * | 7/2002 | Tabata et al. .................. | 717/149 |
| 2006/0271287 A1 | 11/2006 | Gold et al. | |
| 2007/0022411 A1 * | 1/2007 | Tromey ......................... | 717/140 |
| 2008/0092109 A1 * | 4/2008 | Kinnucan et al. ............. | 717/105 |
| 2008/0127233 A1 * | 5/2008 | Neil et al. ...................... | 719/330 |
| 2008/0256469 A1 * | 10/2008 | Jain et al. ....................... | 715/764 |
| 2010/0125835 A1 * | 5/2010 | Kandasamy et al. .......... | 717/151 |
| 2010/0251228 A1 * | 9/2010 | Mercer et al. .................. | 717/155 |
| 2011/0041140 A1 | 2/2011 | Harm et al. | |
| 2011/0061007 A1 * | 3/2011 | Shah et al. ...................... | 715/763 |
| 2011/0078670 A1 * | 3/2011 | Viry ................................ | 717/149 |
| 2011/0113409 A1 * | 5/2011 | Evans et al. .................... | 717/140 |
| 2011/0161941 A1 * | 6/2011 | Thomson et al. .............. | 717/140 |
| 2013/0014092 A1 * | 1/2013 | Hiniker .......................... | 717/140 |

OTHER PUBLICATIONS

"JavaScript: export statement", w3resource, retrieved from <http://www.w3resource.com/javascript/statements/export.php>, visited Feb. 3, 2012.

"Using JavaScript code modules—MDN", retrieved from <https://developer.mozilla.org/en/JavaScript_code_modules/Using>, visited Feb. 3, 2012.

(Continued)

*Primary Examiner* — Isaac Tecklu
(74) *Attorney, Agent, or Firm* — McDermott Will & Emery LLP

(57) ABSTRACT

Systems and methods for compiling one or more code blocks written in programming language are provided. In some aspects, display associated with application is provided. Display includes plurality of graphical objects. That each of plurality of graphical objects is associated with child code block in one-to-one association between graphical objects and child code blocks is determined. Each child code block is written in programming language. The child code blocks associated with plurality of graphical objects are transformed into single parent code block. Parent code block, upon compiling, is configured to be reused across execution contexts and to allow injection of global scope. Parent code block, upon specific execution, includes execution context for specified child code block. Parent code block is configured to receive indication of specified child code block for initiating execution of parent code block. Parent code block is compiled.

26 Claims, 11 Drawing Sheets

(56) References Cited

OTHER PUBLICATIONS

"Scope (computer science)", retrieved from <http://en.wikipedia.org/wiki/Scope_(computer_science), visited Nov. 28, 2011.

"Closure Complier (Labs)", Google code labs, retrieved from <http://code.google.com/closure/compiler>, visited Nov. 28, 2011.

"Javascript Closures", retrieved from <http://jibbering.com/faq/notes/closures>, visited Nov. 28, 2011.

Perry, "System Compositions and Shared Dependencies," System Configuration Management, ICSE'96 SCM-6 Workshop, Berlin, Germany, Mar. 25-26, 1996, Proceedings. Lecture Notes in Computer Science 1167 Springer 1996, pp. 139-153.

Mock, Using IIFEs in JavScript to control variable scope (Oct. 11, 2011), retrieved from http:tech.myemma.com/lifes-javascript-control-variable-scope/ on Oct. 1, 2013.

Goggle, Closure Compiler (2009), retrieved from http://closure-compiler.appspot.com/home on Oct. 1, 2013.

Santos, Closure Compiler AST Documentation (Sep. 22, 2010), retrieved from http://www.google.com/url?sa=t&rct=j&q=&esrc=s& frm=1& source=web& cd=1&cad=rja& ved=0CCsQFjAA& url=http% 3A%2F%2Fclosure—compiler-googlecode.com%2Ffiles%2Fclosure-compiler- ast.pdf& ei=2uxKUpQyrMLgA7KHg ZAG&usg=AFQjCNE_ 4QNm7odoLjCTORma G5cReaR3Sw&bvm=bv.53371865,d.dmg on Oct. 1, 2013.

\* cited by examiner

US 8,677,332 B1

EXECUTING MULTIPLE CHILD CODE BLOCKS VIA A SINGLE COMPILED PARENT CODE BLOCK

CROSS-REFERENCE TO RELATED APPLICATIONS

The present application claims the benefit of priority under 35 U.S.C. §119 from U.S. Provisional Patent Application Ser. No. 61/664,673 entitled "EXECUTING MULTIPLE CHILD CODE BLOCKS VIA A SINGLE COMPILED PARENT CODE BLOCK," filed on Jun. 26, 2012, the disclosure of which is hereby incorporated by reference in its entirety for all purposes.

FIELD

The subject technology generally relates to interfaces for programming languages and, in particular, relates to executing multiple child code blocks via a single compiled parent code block.

BACKGROUND

Some applications (e.g., webpages) may display multiple graphical components (e.g., buttons) associated with code blocks written in a scripting language. Such applications with multiple graphical components associated with multiple code blocks may load slowly. As the foregoing illustrates, a new approach for loading applications more quickly may be desirable.

SUMMARY

The disclosed subject matter relates to a computer-implemented method for compiling one or more code blocks written in a programming language. The method includes providing a display associated with an application. The display includes a plurality of graphical objects. The method includes determining that each of the plurality of graphical objects is associated with a child code block in a one-to-one association between the graphical objects and the child code blocks. Each child code block is written in a programming language. The method includes transforming the child code blocks associated with the plurality of graphical objects into a single parent code block. The parent code block, upon compiling, is configured to be reused across execution contexts and to allow injection of a global scope. The parent code block, upon a specific execution, includes an execution context for a specified child code block. The parent code block is configured to receive an indication of the specified child code block for initiating execution of the parent code block. The method includes compiling the parent code block.

The disclosed subject matter relates to a machine-readable medium encoded with executable instructions for preparing for compiling of one or more code blocks written in a programming language. The instructions include code for determining that each of a plurality of graphical objects is associated with a child code block in a one-to-one association between the graphical objects and the child code blocks. Each child code block is written in a programming language. The plurality of graphical objects are displayed within a window of an application. The instructions include code for transforming the child code blocks associated with the plurality of graphical objects into a single parent code block. The parent code block, upon compiling, is configured to be reused across execution contexts and to allow injection of a global scope. The parent code block, upon a specific execution, includes an execution context for a specified child code block. The parent code block is configured to receive an indication of the specified child code block for initiating execution of the parent code block.

The disclosed subject matter further relates to a system. The system includes one or more processors. The system also includes a memory that includes instructions that, when executed by the one or more processors, cause the one or more processors to implement a method for compiling one or more modules written in a programming language. The instructions include code to provide a display associated with an application. The display includes a plurality of graphical objects. The instructions include code to determine that each of the plurality of graphical objects is associated with a child code block in a one-to-one association between the graphical objects and the child code blocks. Each child code block is written in a scripting language. Each child code block shares an identical base library or overlapping code with each other child code block. The identical base library or overlapping code comprises one or more functions. The instructions include code to transform the child code blocks associated with the plurality of graphical objects into a single parent code block. The parent code block, upon compiling, is configured to be reused across execution contexts and to allow injection of a global scope. The parent code block, upon a specific execution, includes an execution context for a specified child code block. The parent code block is configured to receive an indication of the specified child code block for initiating execution of the parent code block. The instructions include code to compile the parent code block.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

Figure 1:
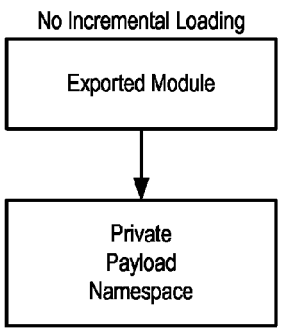
FIG. 1 is a block diagram of an example software configuration that loads code payloads at one time in a private namespace.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As set forth above, some applications (e.g., webpages) may display multiple graphical components (e.g., buttons) associated with code blocks written in a scripting language or other programming language. Each of the multiple code blocks may exist in its own inline frame (iframe). As a result, when loading, the application recompiles each of the multiple code blocks. In some examples, each of the multiple code blocks may have overlapping code, for example code having the same base libraries. However, some of the multiple code block(s) may exhibit different behavior from other code block(s). For example, one code block may be for indicating a preference for a content item via a social network and another code block may be for sharing a content item via the social network. In some examples, each of the multiple code blocks may include code for taking one or more actions on an associated object. The one or more actions may be identical for each and every one of the child code blocks, while each of the child code blocks may have its own associated object. For example, the graphical object may correspond to a prefer (e.g., "like" or "+1") button for indicating a preference for a content item (corresponding to the associated object) in the application via a social network. The one or more actions for indicating the preference may be the same for all of the content items, while each content item may be different. In such circumstances, compiling each of the multiple code blocks individually may be wasteful of resources such as time, memory, or processor availability as the same code (e.g., the same base library) may be compiled multiple times. As the foregoing illustrates, a new approach for compiling multiple code blocks that take similar action(s) on different associated object(s) may be desirable.

In some aspects, the subject technology is related to executing multiple child code blocks via a single compiled parent code block. A client computing device provides a display associated with an application (e.g., a web browser displaying a webpage). The display includes multiple graphical objects (e.g., buttons or hypertext markup language (HTML) elements for indicating a preference for (e.g., "prefer," "like," or "+1") a content item via a social network). The client computing device determines that each of the multiple graphical objects is associated with a child code block (which may include, for example, code for preferring the content item) in a one-to-one association between the graphical objects and the child code blocks. Each child code block is written in a programming language, for example, a scripting language. In some examples, each and every one of the child code blocks shares overlapping code with the other child code blocks, for example, the child code blocks may have one or more shared base libraries. In some examples, each child code block includes code for taking one or more actions (e.g., indicating a preference via a social network) on an associated object (e.g., a content item displayed via the application). The one or more actions are identical or similar for each and every one of the child code blocks. For example, in a first child code block, the one or more actions may correspond to preferring an associated object via a social network, and in a second child code block, the one or more actions may correspond to sharing an associated object via the social network. The associated object is associated with the child code block in a one-to-one association between associated objects and child code blocks. The client computing device transforms the child code blocks associated with the plurality of graphical objects into a single parent code block that includes the overlapping code and/or the one or more shared base libraries. The parent code block, upon compiling, is configured to be reused across execution contexts and to allow injection of a global scope. The parent code block, upon a specific execution, includes an execution context for a specified child code block. The parent code block is configured to receive an indication of the specified child code block (e.g., the associated object of the specified child code block or a pointer to the associated object) for initiating execution of the parent code block. The client computing device compiles the parent code block.

Upon compiling the parent code block, the client computing device may, in some aspects, receive a selection of a first graphical object (e.g., a first button or HTML element for indicating a preference for a content item via a social network). The first graphical object is associated with a first child code block. The client computing device may provide, to the compiled parent code block, in response to the received selection of the first graphical object, an indication of the first child code block. The client computing device may execute, in response to the provided indication of the first child code block and the received selection of the first graphical object, the compiled parent code block in an execution context for the first child code block.

According to some aspects, executing the parent code block in the execution context for the first child code block may include executing code corresponding to the parent code block on an object (e.g., a content item within an application) associated with the first child code block.

A scripting language may refer to a high-level programming language that can be embedded into an application window, for example a web browser window displaying a webpage with hypertext markup language (HTML) code. In some examples, a scripting language may be used to provide code that is downloaded from a server and interpreted, compiled, and executed on a client computing device, affecting the data that the user sees in the application window. In some examples, a scripting language may be used to manipulate data on the server or in a database communicatively coupled to the server. Example scripting languages include JavaScript, VBScript, or Dart.

A program written in a high-level programming language (e.g., a scripting language or a non-machine-language programming language, for example, C, C++, or Java) may be interpreted by converting instructions to a non-machine-language intermediate form that can be executed. A program written in a high-level programming language may be compiled into machine language instructions, which may be executed after completion of compiling.

As used herein, the phrase "one-to-one association" encompasses its plain and ordinary meaning. In some aspects, members of a first set have a one-to-one association with members of a second set if (a) each member of the first set is associated with one member of the second set, (b) each member of the second set is associated with one member of the first set, and (c) if a specified member of the first set is associated with a specified member of the second set, then the specified member of the second set also associated with the specified member of the first set. For example, if the set P includes the numbers {0, 1, 2, 3, 4} and the set Q includes the numbers {5, 6, 7, 8, 9}, there is a one-to-one association between members p of the set P and members q of the set Q, where q=p+5. While the example involves numbers, there may be a one-to-one association between concepts or items other than numbers.

Advantageously, in accordance with some aspects of the subject technology, a webpage may include multiple graphical objects associated with child code blocks that have the same base library and/or some overlapping code and take similar action(s) on different object(s). A single parent code block corresponding to each and every one of the child code blocks that includes the same base library and/or the overlapping code may be parsed or compiled once, reducing compile time for the webpage. If the associated graphical object(s) are selected, each of the child code block(s) associated with the selected graphical object(s) may be executed via the compiled parent code block. In other words, if the webpage includes n graphical objects associated with child code blocks, a parent code block corresponding to the child code blocks may be compiled once and executed m times, where m is a number between 0 and n corresponding to a number of graphical objects that are selected. In one example, n=5 and m=3. However, n and m may correspond to any numbers. In some applications, for example, web browsers, compiling code is much more costly (e.g., in terms of time, processor usage, memory usage, etc.) than executing code, making the subject technology particularly useful in a web browser context.

To assist in the efficient operation of a complex program, a technique referred to as "lazy loading" may be used. Lazy loading defers initialization of an object until the point at which it is needed. Another aspect of computer programming that requires consistency for the effective deployment of a program is that of a namespace. A namespace (sometimes also called a name scope) is an abstract container or environment created to hold a logical grouping of unique identifiers or symbols (i.e., names). An identifier defined in a namespace is associated only with that namespace.

One aspect of lazy loading and minification is that all namespaced identifiers are flattened to reside in a single namespace when using the minification technique or one or more namespace(s) when using the lazy loading technique. In some examples, when using a minification technique, the namespace may be the global namespace in order to be accessible across individually loaded modules. In other examples, when using a minification technique, the namespace may be a non-global window namespace.

When code resides on many web pages on the Internet, the risks of namespace collision is heightened. In addition, as developers release future versions of a program that add one or more identifiers would potentially create other unexpected problems. Polluting the global namespace can further lead to hard-to-debug errors.

In some examples, the subject technology provides techniques for renamespacing implicit globals. In some examples, the subject technology provides techniques for fully qualifying (e.g., using window) explicit globals. Renamespacing may be used for code sharing (e.g., code sharing among child code modules via a parent code module) in some implementations. In other implementations, code sharing may occur without renamespacing.

In some examples, the subject technology includes transforming a given form of source code (e.g., child code blocks) into a form (e.g., parent code block) that can be reused across execution contexts (e.g., via code sharing). Renamespacing may be used in conjunction with the subject technology. In some examples, input source code is be compiled into a form that allows injection of the global scope, thus making possible to use or instantiate the same source code more than once by injection of different global scopes. One JavaScript algorithm for transforming code into the form that allows injection of the global scope is set forth below. However, the subject technology may be used with any programming language and is not limited to JavaScript or to scripting languages. For example, the subject technology may be used with a compiled programming language.

Input source:
var display='none';
document.getElementById('foo').style.display=display;
document.querySelector('.bar').style.display=display;
Transformation:
var display='none';
window.document.getElementById('foo').
   style.display=display;
window.document.querySelector('.bar').
   style.display=display;

In JavaScript, the above transformation represents no semantic change and may be used in conjunction with the code below for injection of global scope and running applications multiple times (e.g., N times, where N is any natural number).

Injection of global scope
function javaScriptCallback(window){
   var display='none';
   window.document.getElementById('foo').
     style.display=display;
   window.document.querySelector('.bar').
     style.display=display;
}
Application N-Times
javaScriptCallback(iframe1);
javaScriptCallback(iframe2);
javaScriptCallback(iframeN);

In some aspects, code sharing is implemented via fully qualifying explicit globals. All needed code (e.g., code for a parent code block) can be loaded in a single functional closure without renamespacing globals. However, explicit globals are scoped so that when the payload is executed, a context (e.g., an execution context for a specified child code block) may be injected. In some aspects, the subject technology relates to injecting global scope into a function closure of code.

In FIG. 1 an application programming interface ("API") is exported and delivers a payload that is contained within a private namespace. In this configuration, all objects in the program payload will be initialized at one time when the API is exported, but is done within a private network such that the payload will not become publically accessible.

Figure 2:
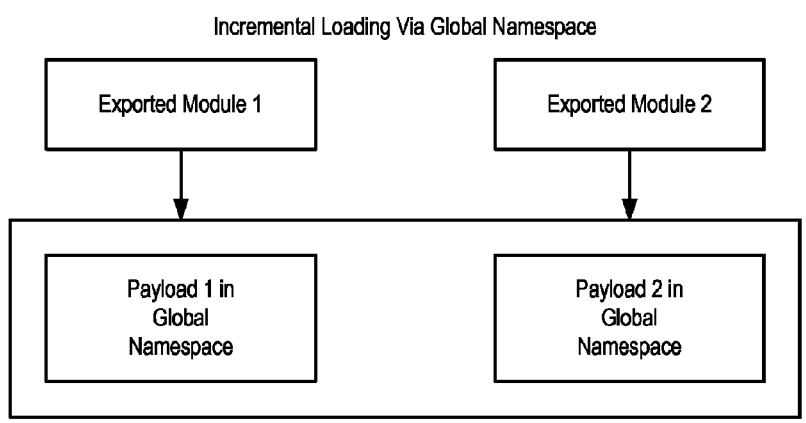
FIG. 2 is a block diagram of an example software configuration that incrementally loads code payloads in a global namespace.

In the configuration of FIG. 2, two APIs are exported at different times (such as when they are needed), thereby delaying the initialization of the objects in the accompanying payloads that each reside in the global namespace. However, in this configuration (as compared to the one show in FIG. 1), the payloads are publically accessible on the third party computers that have requested their delivery.

Figure 3:
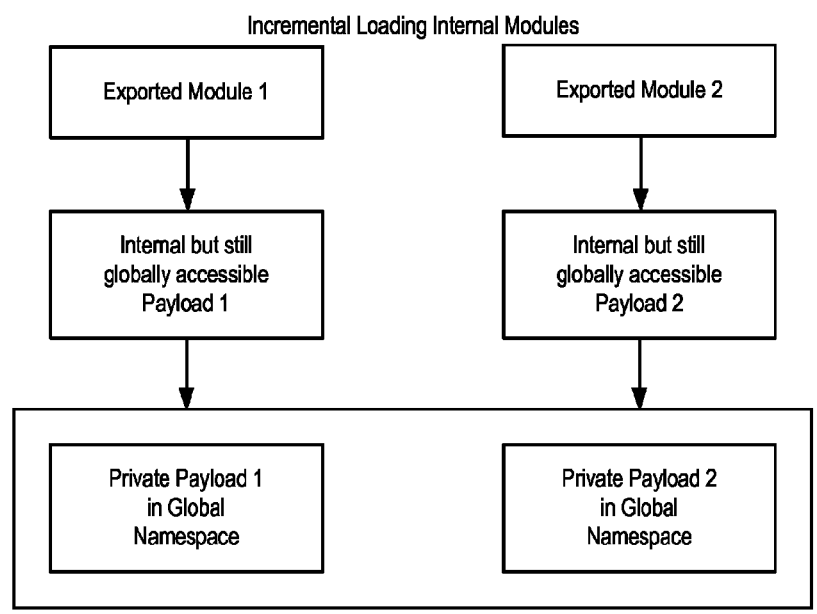
FIG. 3 is a block diagram of an example software configuration that incrementally loads code payloads in a global namespace using a linker to ambiguate between internal application program interfaces and external application program interfaces.

In the configuration of FIG. 3, two APIs are first exported internally to a marshalling layer that is internal but still provides APIs that are accessible by third parties to deliver payloads but will remain private due to the use of a traditional linker program, thereby minimizing some of the payload's footprint.

Figure 4:
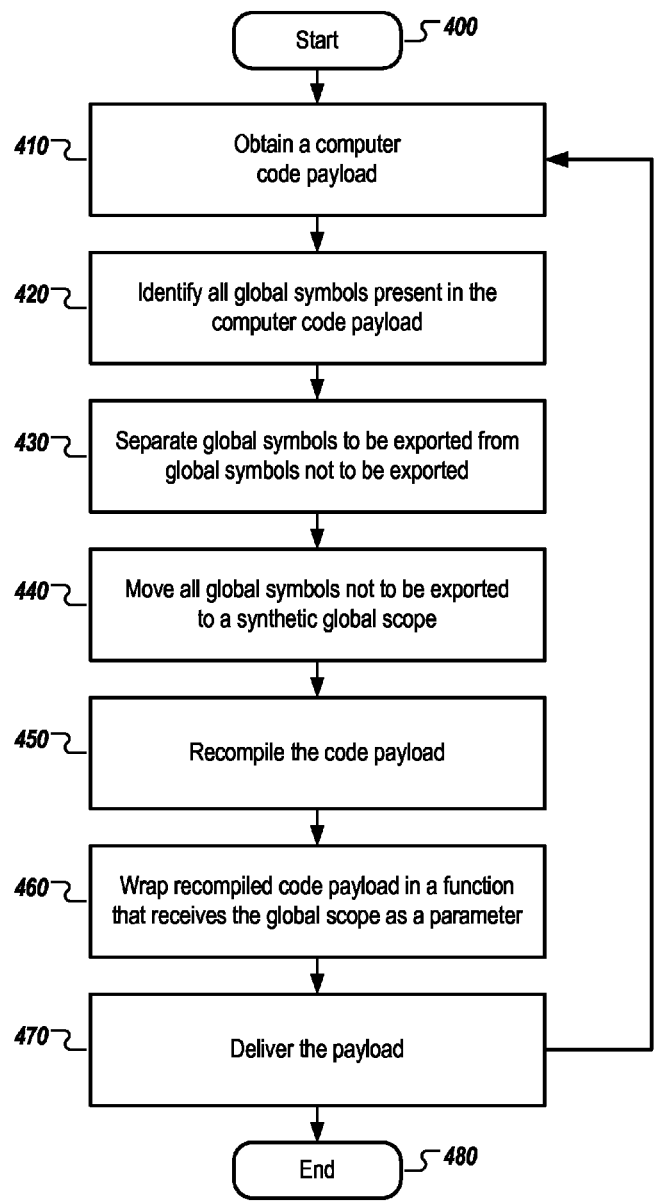
FIG. 4 is a flow chart illustrating a module processing process according to some aspects.
Figure 7:
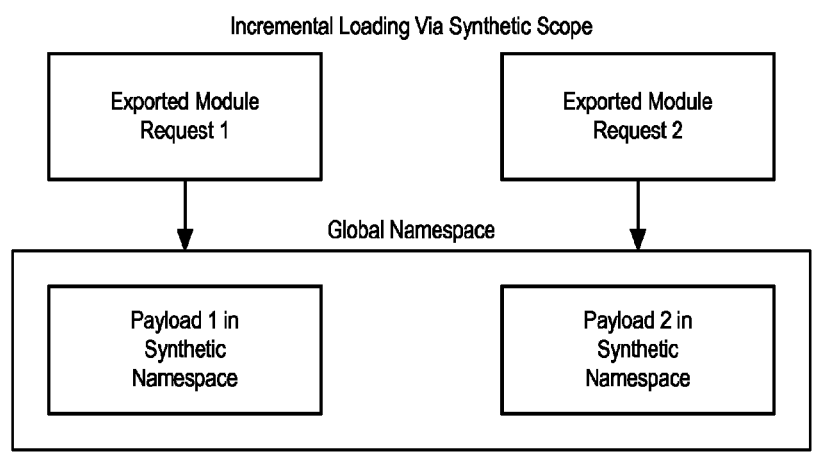
FIG. 7 is a block diagram of a software configuration according to an example that incrementally loads code payloads in a synthetic scope.
Figure 8:
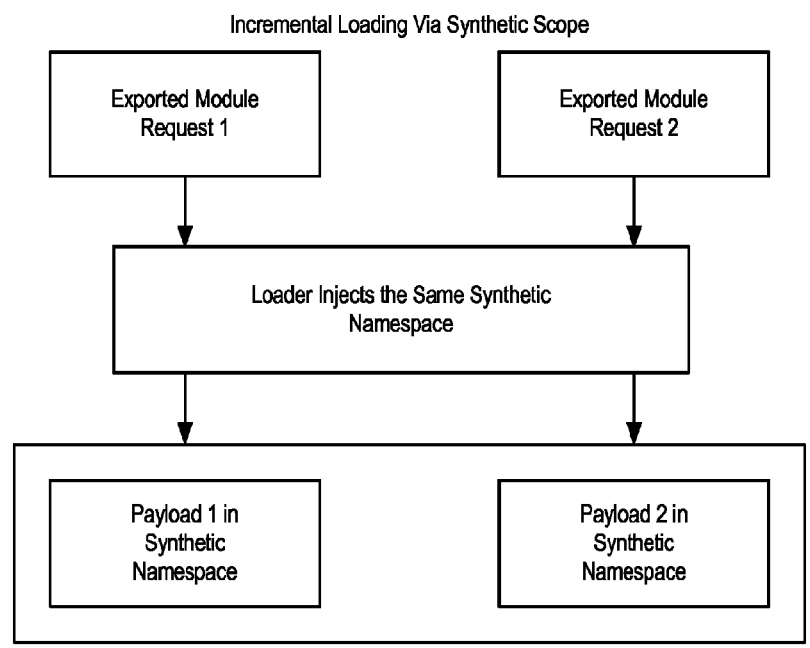
FIG. 8 is a block diagram of a software configuration according to an example that incrementally loads code payloads in a synthetic namespace using a client side loader.

FIGS. 4, 7, and 8 illustrate high-level overviews of processes for transforming code according to aspects of the subject technology. In step 400 of the process, there is a request for a module. This could be, for example, a request from a client device, server, or anything running or including a program or code for communicating with and/or requesting a module, including but not limited to a web page requesting a module from a module server in response to a user action, although there are many other ways for requesting and/or delivering code known in the art, including automated requests for code, timed requests for code, requests for code that are responsive to an event, action, or motion, and many other modes of requesting or delivering code. The module, in turn, can be a script, function, module, or other discrete unit of code. For example, the module can be a JavaScript function.

According to some aspects, a client device including a browser with a loaded web page running one or more JavaScript modules requests an additional JavaScript module from the module server that is in communication with the client device and browser via a network such as the Internet. A loaded and executing JavaScript module, for example, tells the module server that it needs the code for executing a specific action prompted by a user event.

In step 410, a server-side component such as a module server gathers the requested module (the "payload") from memory, receives it from another device or server, or otherwise obtains the module from a source. Once the payload is obtained, it can be processed in step 420 of the process. At this step, the payload is analyzed, using any of a number of processes well-known in the art, to identify all the global symbols (or "variables") present in the code. Global symbols can be any symbol or variable that is meant to exist outside the specific payload, thus being accessible by other modules in the overall system. When a module such as a JavaScript module is loaded into a system such that it will or might interact with other modules in that system, it can both export and import any variables that it designates—and/or variables that the other modules/functions already extant in the system designate—as being globally accessible. Since they are accessible by each module in the system, these exported and imported variables are termed global symbols, in comparison with local symbols which are only found and used inside a single module. Local variables live and die with the function in which they are incorporated. While global variables are not used excessively because they can cause conflicts between modules in a namespace (for example, module A exports global variable X to the global namespace, and module B is then loaded into the same global namespace and exports a second global variable X, thereby polluting the global namespace), they can be an important aspect of a program. Indeed, global variables are often created as a result of namespace flattening during minification which can turn all previously namespaced symbols into global symbols.

Once the possible global variables in the payload are identified, they are categorized in step 440 of the process into at least two different categories: (i) global variables that are explicitly exported by the module; and (ii) global variables that are not explicitly exported by the module. Note that this categorization may be an action such as creating two lists in memory rather than any physical segregation, among many other processes of categorization. As used herein, the phrase "global variables," may encompass global variables (e.g., integer variables, string variables, etc.), global functions, and/or global classes. It should be noted that in JavaScript and some other programming languages functions and classes are indistinguishable from variables.

The global variables that are explicitly exported by the module can be exported, processed, renamed, or otherwise handled following any one of a number of known processes in the art. For example, the explicitly exported global variables can simply be exported without any further processing (which may significantly increase the possibility of namespace pollution). In other aspects, the explicitly exported global variables are all renamed to avoid conflicts between the global symbols and other code in first and third-party sites. While this prevents many conflict scenarios, the need to keep the prefix short to save bytes and reducing network transmission time opens up the change for future collisions.

In step 440 of the process, all global symbols that are not explicitly exported are moved to a synthetic global scope, and in step 450 the module is recompiled. To accomplish this step, the system can, for example, traverse an abstract syntax tree ("AST") of the program and replace every reference to a global symbol that is not to be explicitly exported to be a property access of the name of the synthetic global scope object, although there are several other processes of replacing references known in the art. For example:

var a=1; function b( ) {return a}</pre> becomes

NS.a=1; NS.b=function ( ) return NS.a} where NS is the synthetic global scope.

However, as set forth above, rescoped globals are not strictly necessary for code sharing (e.g., among multiple child code blocks using a single parent code block, as described herein, for example, in conjunction with FIGS. 9-12). In some examples, code sharing may be implemented without use of rescoped globals.

In step 460 of the process, the processed payload can be wrapped in a function that receives the synthetic scope as a parameter using any of a number of processes. As just one example, code that originally reads as follows prior to being processed according to some aspects of the present process:

function GP_a(a) {
. . . . . . }
var GP_b=123;

could be transformed to read as follows after running the transforming program:

Xapi_loaded ('module_set/name', function(global1) {
// this===window
global1.a=function(a) {
. . .
}
global1.b=123; });

where "global1" is the synthetic global scope.

The code above illustrates an example synthetic namespace transformation without code sharing. An example with a code sharing transformation appears below.

```
function GP_a(a) { . . . . . . }
setTimeout(function( ) { . . . }, 0)
var GP_b=123;
becomes:
Xapi_loaded ('module_set/name', function(global1) {
var window=this;
global1.a=function(a) {
. . . }
global1.b=123;
window.setTimeout(function( ) { . . . }, 0);
});
```

Above, "window" is the name of the global variable. The "var window=this" assignment is used because this makes the transformation invariant. As a result, according to some aspects of the subject technology, the code can still run without the specific code sharing runtime component.

All payloads in the system processed by the process described herein will therefore have access to the same synthetic scope (and the symbols exported thereto), and no symbols will be involuntarily leaked into the existing global scope of the system. In other words, the scope object ("global1" in the above example) will be shared between individually loaded modules, thus providing the desired access to dependencies in previously loaded modules. Since the scope object is not referred to be name (e.g., it only has to be lexically visible to the Xape_loaded function as in the example above), and thus does not leak into user space.

Finally, in step 470 of the process, the processed payload is delivered to the requestor using any one of a number of known processes and systems in the art.

As an additional step in the process, and using processes known in the art, the transforming program (or another program or module) can also perform code minification. Often, JavaScript minification with property collapsing tries to move all symbols into one scope level. In order for different payloads to access that scope level, especially in the context of deferred loading, the scope is by necessity the global scope, which results in numerous symbols spilling into the global scope. This can create issues if multiple modules reside in the same namespace, especially if the namespace is a web page containing any number of other modules from any number of third parties. Using the processes and systems of some aspects of the subject technology, however, code minification can be accomplished without moving all symbols into a single scope level and therefore without polluting the scope level. For example, the global variable can be minified to only 1 byte, thereby saving 1 byte per variable use against current processes, which is using a prefix on every global identifier in order to prevent collisions and pollution of the namespace.

According to other aspects of the process, the module server can be extended to accept a callback parameter such as the following:

cb=Xapi_loaded

Notably, according to some aspects of the subject technology, the name of the callback is preferably always the same in order to improve the cacheability of requests.

An additional option that could be incorporated into the transforming program is to call the callback with more parameters in order to support dual inclusion scenarios where different versions of the same module could reside together in a global namespace. For example:

```
Xapi_loaded('module_set/name, 'version', 'module_m-
   ods', function(global1) {
var window=this;
global1.a=function(a) {
. . .
global1.b=123; D;
```

In addition, known global variables could also be passed to the code callback, thereby enabling cross-friendly-frames, sometimes called "same-origin frames," reuse of the same JavaScript code: For example:

```
Xapi_loaded('module_set/name', function(global1, win-
   dow, document) {
//this===a Window
global1.a +function(a)
. . .
}
global1.b=123; D
```

Figure 5:
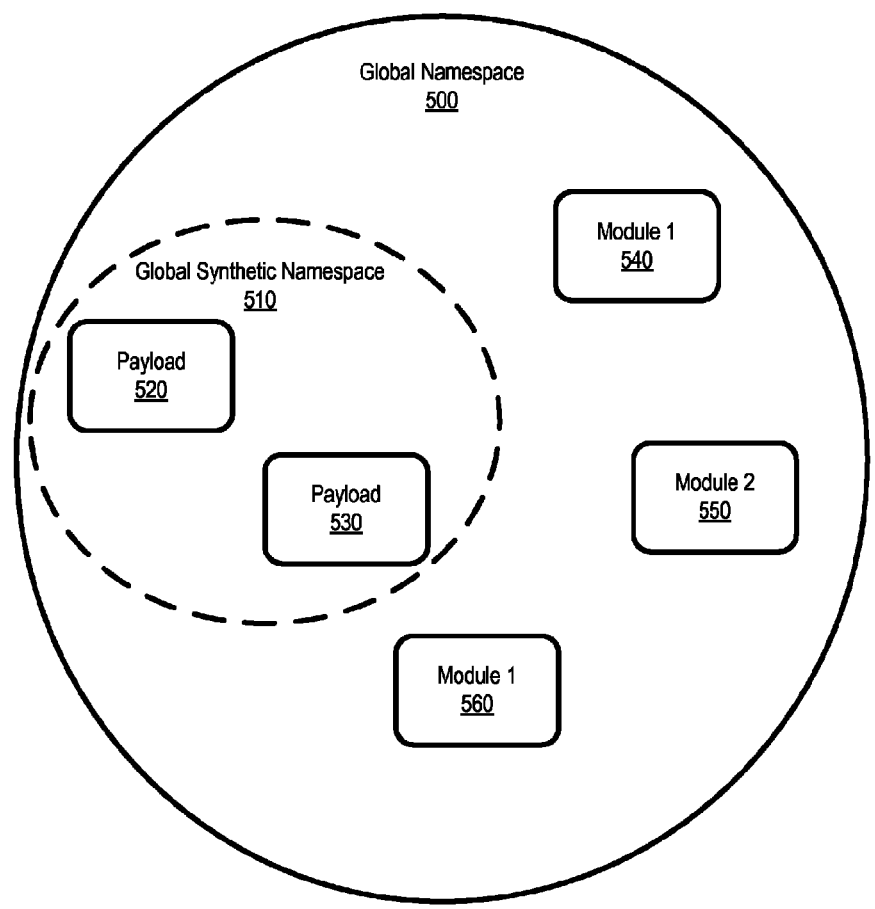
FIG. 5 is a schematic diagram of a synthetic namespace inside a global namespace, both containing modules, according to an example.

FIG. 5 is a schematic depiction of a global namespace according to some aspects of the subject technology. It should be noted that this schematic depiction is only a two-dimensional representation of a global namespace. It can represent, for example, a web page including several different modules, such as a web page loaded into a browser and including several JavaScript modules.

Initially, global namespace 500 includes the three modules 540, 550, and 560. An additional module is then requested by the system, possibly in response to an automated feature or some user action. The system sends the request to a module server requesting the module, and the module server performs one or more of the following steps of the process described herein to process the payload, including but not limited to: (i) gathering, retrieving, or receiving the requested payload at or by the module server; (ii) processing the payload to identify all global symbols; (iii) categorizing all the global symbols; (iv) moving to a synthetic global scope all global symbols that are not explicitly exported; and (v) wrapping the processed payload in a function that receives the synthetic scope as a parameter. The processed payload can then be delivered to the requesting system using any one of a number of known processes and systems in the art.

For example, the system in FIG. 8 has requested and received two additional modules, Payload 520 and Payload 530, which exist inside the synthetic global namespace 510. Both Payload 520 and Payload 530 have access to the global variables defined inside synthetic global namespace 510, as well as the global variables defined inside global namespace 500. An actual global namespace or synthetic global namespace can have more modules than are shown in FIG. 5, and there can further be more synthetic global namespaces inside global namespace 500.

As shown in FIG. 7, which uses one or more of the processes described or suggested herein, the APIs can be exported incrementally and the payloads that are delivered upon request will be inside the synthetic scope instead of the global scope.

In FIG. 8, a client-side loader incrementally loads code payloads in a synthetic namespace using one or more of the processes suggested or described herein. The client-side loader injects the same synthetic namespace into each module requested and incrementally loaded into the system.

Figure 6:
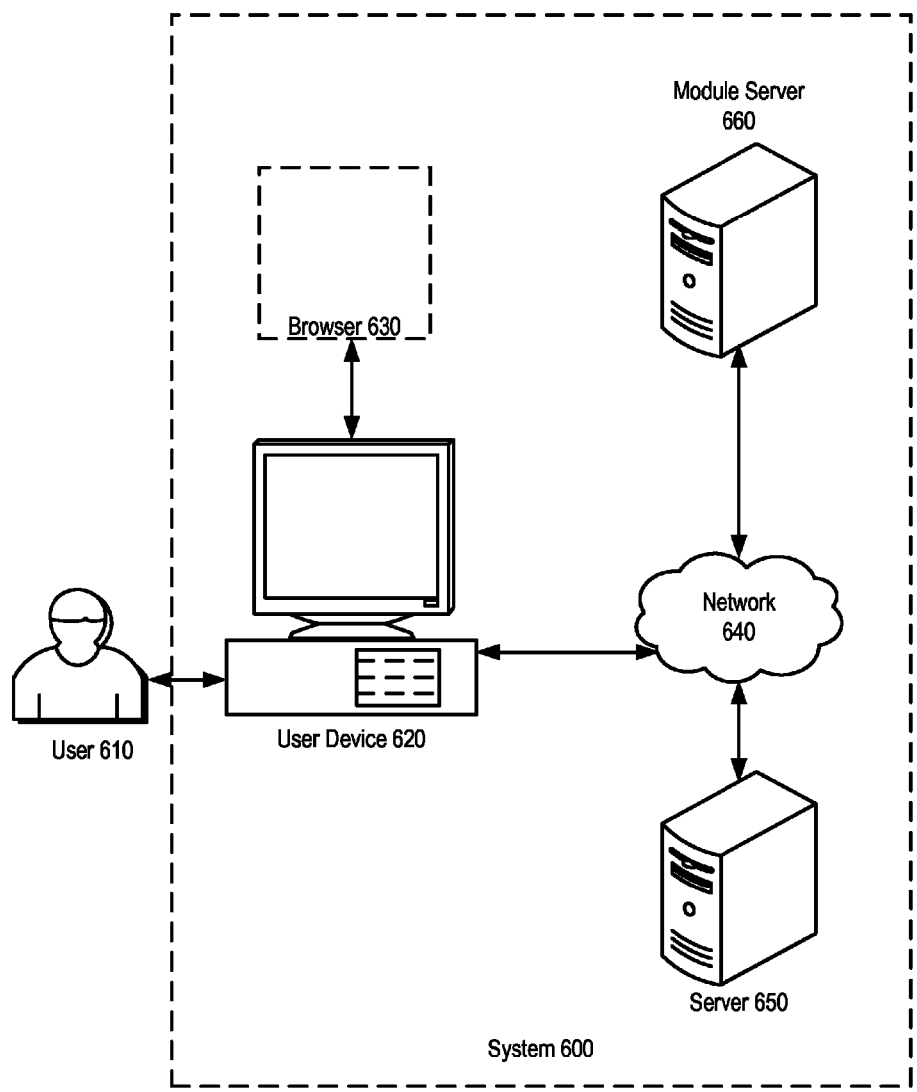
FIG. 6 is a diagram of an example module processing.

FIG. 6 is a schematic drawing of a system 600 in which module processing process can operate according to some aspects of the process. System 600 includes, for example, a network 640 that connects user device 620 to a local or remote sever 650 and a local or remote module server 660. Network 640 can be any suitable wired or wireless network capable of transmitting communication, including but not limited to a telephone network, Internet, Intranet, local area network, Ethernet, online communication, offline communications, wireless communications and/or similar communications means. User device 620 is preferably any device capable of running, mirroring, displaying, or otherwise interacting with software requiring multiple database transaction requests. This includes, but is not limited to, desktops, laptops, tablets, personal digital assistants, personal digital devices, cellular phones, mobile computers, netbooks, smartphones, pocket computers, and handheld computers, among many others. In other words, user device 620 can be any device including a processor and a network connection.

By way of example, user device 620 can include a software or program component such as a web browser 630. Browser 630 is designed to enable user 610 to access, retrieve, and view resources and documents, including resources and documents found on the Internet or an Intranet, among other sources. For example, the browser can be designed for viewing an Intranet within an organization, or any other connection of local computers.

System 600 may also include only user device 620 and a software or program component. In this system, the software or program component which is the web browser in the aspects described above is designed for viewing locally-stored files. In these aspects, system 600 and the processes described herein are used to manage the local database without a network connection, or without accessing an available network connection.

According to some aspects of the subject technology, the browser loads a web page or program via communication with server 650 over network 640. In response to an action by user 610, or an action or inquiry initiated by some other component of system 600, the browser requests an additional module from module server 660 via communication over network 640. Module server 660 processes the requested module using any of the processes described or envisioned herein, and sends it to user device 620 and the browser via the network.

Figure 9:
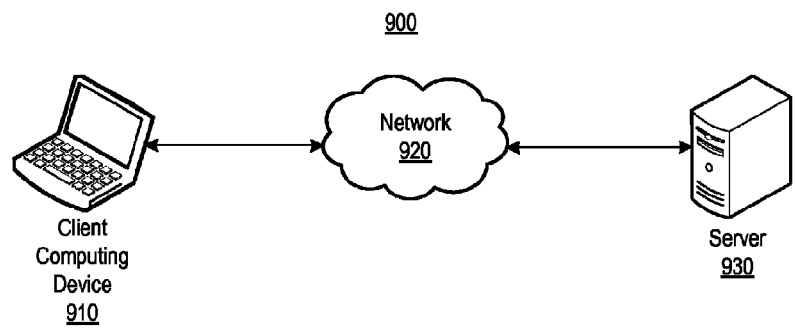
FIG. 9 illustrates an example of a system for executing multiple child code blocks via a single compiled parent code block.

FIG. 9 illustrates an example of a system 900 for executing multiple child code blocks via a single compiled parent code block.

As shown, the system 900 includes a client computing device 910 and a server 930 connected via a network 920.

The client computing device 910 may correspond to the user device 620 of FIG. 6. The server 930 may correspond to the server 650 and/or the module server 660 of FIG. 6. The network 920 may correspond to the network 640 of FIG. 6.

The client computing device 910 may be a laptop computer, a desktop computer, a mobile phone, a tablet computer, a personal digital assistant (PDA), etc. The client computing device 910 may be any device configured to connect to the network 920 and present representations of content downloaded via the network 920 via an application, for example a web browser or any other application (e.g., a mobile phone application). The client computing device 910 may download data (e.g., multimedia data or code for applications or modules, as described below) over the network 920, for example, from the server 930. The client computing device is described in more detail in conjunction with FIG. 10, below.

The network 920 may be any network that allows multiple devices to communicate and exchange data. For example, the network 920 may correspond one or more of the Internet, a cellular network, a WiFi network, a local area network (LAN), a wide area network (WAN), etc.

The server 930 may be a web server or a content server. The server 930 may correspond to any one or more computing devices that provide data to a client computing device 910. The data may include multimedia data (e.g., text, images, videos, or audio files) or code executing on the client computing device 910 (e.g., programming language (e.g., scripting language) code or applications to be downloaded to the client computing device 910). The server 930 may be implemented as a single machine with a single processor, a single machine with multiple processors, or as a server farm including multiple machines and multiple processors.

Figure 10:
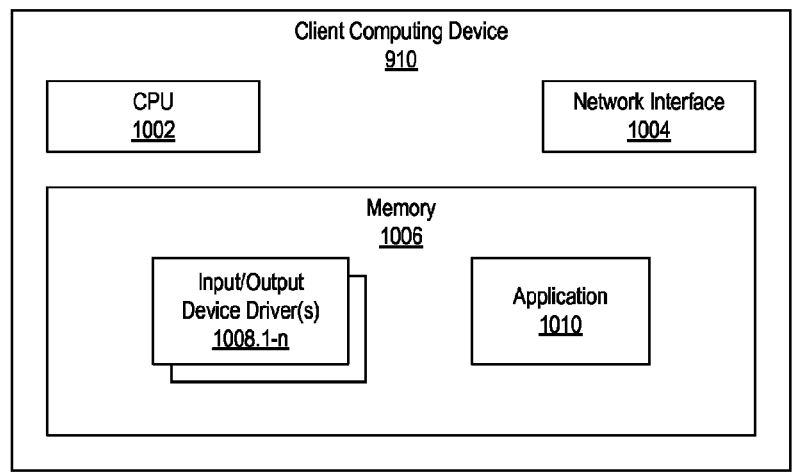
FIG. 10 illustrates an example of the client computing device of FIG. 9.

FIG. 10 illustrates an example of the client computing device 910 of FIG. 9.

As shown, the client computing device 910 includes a central processing unit (CPU) 1002, a network interface 1004, and a memory 1006. The CPU 1002 may include one or more processors. The CPU 1002 is configured to execute computer instructions that are stored in a computer-readable medium, for example, the memory 1006. The network interface 1004 is configured to allow the client computing device 910 to transmit and receive data in a network, e.g., network 920 of FIG. 9. The network interface 1004 may include one or more network interface cards (NICs). The memory 1006 stores data or instructions. The memory 1006 may be one or more of a cache unit, a storage unit, an internal memory unit, or an external memory unit. As illustrated, the memory 1006 includes input/output device driver(s) 1008.1-$n$ and an application 1010. While the memory 1006 is illustrated as including a single application 1010, the memory may include any number of applications.

The input/output device driver(s) 1008.1-$n$ may be configured to allow the client computing device 910 to interact with one or more input/output devices, for example, user input-output devices. Example input-output devices include a mouse, a keyboard, a touch screen, a display device, a speaker, a microphone, etc. The input/output device driver(s) 1008.1-$n$ may be configured to receive input associated with the input devices and to convert the input to a representation of the input that can be transmitted to an application (e.g., application 1010). The input/output device driver(s) may be configured to convert a representation of output (e.g., audio or visual output) received from an application (e.g., application 1010) to an output provided by an output device (e.g., a speaker or a screen). A single input/output device driver 1008.$k$ may correspond to an input device (e.g., a mouse), an output device (e.g., a speaker), or a device configured to provide both input and output (e.g., a touch screen). Example input/output device drivers include a mouse driver, a keyboard driver, a touch screen driver, a non-touch screen driver, a speaker driver, or a microphone driver.

The application 1010 may be any application configured to compile received code blocks (e.g., code blocks in a scripting language or other programming language) during execution of the application. For example, the application 1010 may correspond to a web browser or a mobile phone application for accessing web-based content (e.g., a mobile phone application for a social networking service). In some aspects, the application 1010 corresponds to the browser 630 of FIG. 6.

Figure 11:
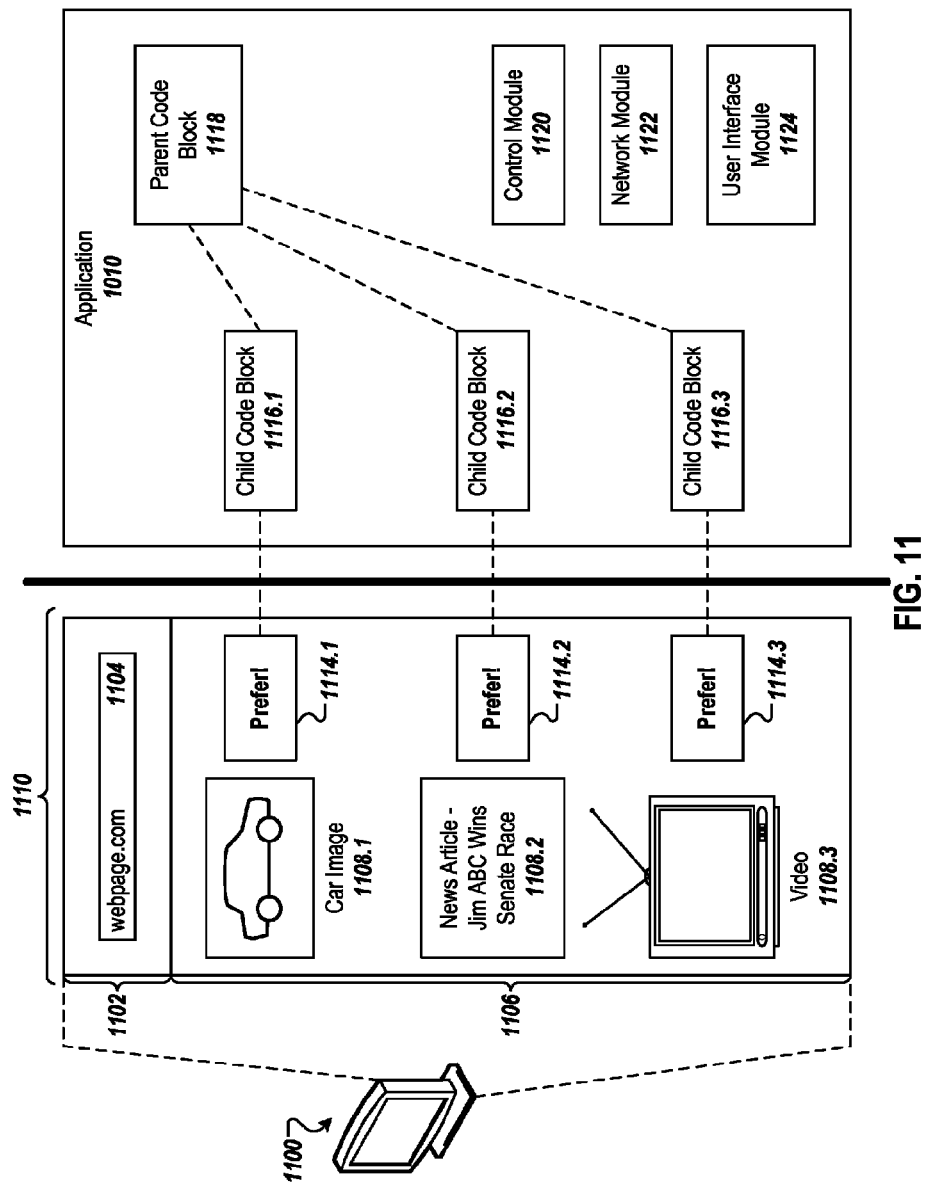
FIG. 11 illustrates an example of the application of FIG. 10 and an output associated with the application of FIG. 10.

FIG. 11 illustrates an example of the application 1010 of FIG. 10 and an output associated with the application 1010 of FIG. 10.

As shown in FIG. 11, a display device 1100 (e.g., a monitor) corresponding to a client computing device (e.g., client computing device 910) displays an output corresponding to the application 1010. As illustrated, the application 1010 is a web browser displaying a webpage within a web browser window 1110. However, the application 1010 may correspond to any other application, for example, a mobile phone or tablet computer application that displays content downloaded via a network. The web browser window 1110 includes a header region 1102 and a webpage display region 1106.

The header region 1102 may include an input box 1104 for entering a uniform resource locator (URL) corresponding to a webpage to be displayed.

The webpage display region 1106 may display a webpage corresponding to the URL entered in the input box 1104. As shown, the webpage includes content items 1108.1-3. As shown, the content items correspond to an image 1108.1, a news article 1108.2, and a video 1108.3. However, any other content items (e.g., social network posts, blog posts, audio content items, chat rooms, etc.) may be used in conjunction with the subject technology. As shown, each content item 1108.1-3 is associated with a prefer button 1114.1-3, respectively. Each prefer button 1114.k, when selected, may be configured to cause execution of code for sharing or indicating a preference for the associated content item 1108.k via a social network. The prefer button(s) 1114.1-3 may correspond to "Like" buttons or "+1" buttons. In some implementations, one or more of the prefer button(s) 1114.1-3 may be replaced with a share button (for sharing content via the social network) or any other button(s) or hypertext markup language (HTML) element(s). For example, the prefer button 1114.3 may be replaced with a share button. Each prefer button 1114.k may reside in its own inline frame (iframe) that is not shared with any other prefer button. While three content items 1108.1-3 are illustrated, the subject technology may be implemented with any number of content items. Also, while three prefer buttons 1114.1-3 are illustrated, the subject technology may be implemented with any number of prefer button(s). In one aspect, there is a one-to-one association between content item(s) and prefer button(s).

FIG. 11 also illustrates an example of module(s) residing in the memory (e.g., memory 1006) of the client computing device (e.g., client computing device 910) corresponding to the application 1010. As illustrated, the application 1010 includes child code blocks 1116.1-3, a parent code block 1118, a control module 1120, a network module 1122, and a user interface module 1124.

As shown, each prefer button 1114.1-3 is associate with a child code block 1116.1-3, respectively. While three child code blocks are illustrated, the subject technology may be implemented with any number of child code block(s). In some aspects, there is a one-to-one association between prefer button(s) and child code block(s). In some aspects, each child code block 1116.1-3 is written in a programming language, for example, a scripting language (e.g., JavaScript, VBScript, or Dart).

In some aspects, each child code block 1116.1-3 uses the same base library as each other child code block 1116.1-3 and/or the child code blocks 1116.1-3 include overlapping code. The base library may include one or more functions that are used by each and every one of the child code blocks 1116.1-3. In one example, some of the child code block(s) 1116.1-3 correspond to prefer buttons, while other child code block(s) correspond to share buttons. Both the prefer button child code block(s) and the share button child code block(s) bay include the function getUserSocialID( ) and postToSocialNetwork( ) in the same base library and/or overlapping code. However, the code corresponding to the child code block(s) for the prefer button(s) and the code corresponding to the child code block(s) for the share button(s) may be different. In other words, the prefer button child code block(s) and the share button child code block(s) may have different behaviors.

In some aspects, each child code block 1114.k includes code for taking one or more actions on an associated object (e.g., the associated content item 1108.k). The one or more actions are identical or similar for each and every one of the child code blocks 1114.1-3. Each of the associated objects is associated with the child code blocks 1114.1-3 in a one-to-one association between associated objects and child code blocks. For example, the code to prefer the car image 1108.1, executed by child code block 1116.1, may be identical or similar to the code to prefer the news article 1108.2, executed by child code block 1116.2, except that the code to prefer the car image 1108.1 refers to the car image 1108.1 as an object, while the code to prefer the news article 1108.2 refers to the news article 1108.2 as an object. In one example, a variable in the code (of the child code blocks 1116.1 and 1116.2) is used to represent either the car image 1108.1 or the news article 1108.2. Each child code block may have its own inline frame (iframe) that is not shared with any other child code blocks.

The child code blocks 1116.1-3 may be downloaded to the client computing device (e.g., client computing device 910) from a server (e.g., server 930) via a network (e.g., network 920). In some aspects, the child code blocks 1116.1-3 may correspond to module(s) whose payloads (e.g., payloads 520 and/or 530) are wrapped within the global synthetic namespace 510 of FIG. 5. The global synthetic namespace 510 of FIG. 5 may correspond to a namespace of the application 1010. The child code blocks 1116.1-3 may correspond to the "exported module request 1" of FIG. 8.

In some aspects, the user interface module 1124 provides the display (e.g., in web browser window 1110) associated with the application. The display may be downloaded over the network (e.g., network 920) by operation of the network module 1122. The display may include multiple graphical objects (e.g., prefer buttons 1114.1-3).

In some aspects, the control module 1120 determines that each of the multiple graphical objects is associated with a child code block 1116.1-3 in a one-to-one association between the graphical objects and the child code blocks 1116.1-3.

In some aspects, the control module 1120 causes transformation of the child code blocks 1116.1-3 associated with the multiple graphical objects into a single parent code block 1118. The parent code block 1118 includes an execution context for a specified child code block 1116.k. The parent code block 1118 is configured to receive an indication of the specified child code block for initiating execution of the parent code block 1118. According to some aspects, executing the parent code block 1118 in the execution context for the specified child code block 1116.k may include executing code corresponding to the parent code block 1118 on an object (e.g., a content item 1108.k within the application window 1110) associated with the specified child code block 1116.k. In some aspects, the child code blocks 1116.1-3 and the parent code block 1118 are written in JavaScript. The parent code block 1118 includes a window object representing a global scope. The window object is configured to inject the global scope into the child code block 1116.k corresponding to the prefer button 1114.k (or other button or HTML element) that was selected.

In some aspects, the control module 1120 may explicitly scope externally-referenced symbols (e.g., symbols defined as presuming to be present by name in the global scope of the programming language) to the window object of the programming language. The control module 1120 may add, to the parent code block 1118 a small snippet of code that allows a code closure generated with the transformation(s) to be executed multiple times, each time within the context of a unique iframe. The code may appear as:

var window=this;

The parent code block 1118 may be loaded within a common shared loading iframe. The iframe of the parent code block 1118 may be included in each iframe of the child code block(s) 1116.1-3 to perform code sharing for the iframe(s) of the child code block(s) 1116.1-3. If preloaded code is not available, the code of the child code block(s) 1116.1-3 may be loaded into the sharing iframe (of the parent code block 1118). The code in the sharing iframe may be used by other child code block(s) 1116.1-3 at a later time. In some aspects, only incrementally-required code may be loaded to further save time and/or reduce usage of the network connection, the CPU, and/or memory.

In some aspects, the control module 1120 causes parsing or compiling of the parent code block 1118. After compiling, the parent code block 1118 may be configured to executed one or multiple times. Each of the multiple executions of the parent code block may be configured to take place in the same namespace (e.g., global namespace 500 or global synthetic namespace 510 of FIG. 5) and/or in the same payload (e.g., payload 520 or payload 530 of FIG. 5). Alternatively, each of the multiple executions of the parent code block may be configured to take place in different namespace(s) and/or in different payload(s). As a result, if the parent code block 1118 is executed multiple times, variables named in the parent code block 1118 or the child code block(s) 1116.1-3 may be recycled or reused with each execution. Alternatively, new unique variables may be created for each execution.

In some aspects, the user interface module 1124 receives (e.g., from a user via operation of a mouse or a touch screen) a selection of a first graphical object (e.g., a prefer button 1114.k) from among the multiple graphical objects (e.g., multiple prefer buttons 1114.k). The first graphical object 1114.k is associated with a first child code block 1116.k.

In some aspects, the control module 1120 causes provision, to the parsed or compiled parent code block 1118, in response to the received selection of the first graphical object, an indication of the first child code block 1116.k. The indication of the first child code block 1116.k may be a pointer or data associated with the first child code block 1116.k.

In some aspects, the control module 1120 causes execution, in response to the provided indication of the first child code block 1116.k and the received selection of the first graphical object 1110.k, the compiled parent code block 1118 in an execution context for the first child code block 1116.k.

The subject technology may be used on any JavaScript child code block(s) (or child code blocks in other programming languages, e.g., scripting languages). The transformation(s) described above may utilize core definitions of JavaScript rather than presuming anything about code structure. The code transformation(s) may yield code that works without modification, even when the code for enabling code sharing is not activated. In other words, the code sharing aspects may be gradually introduced on a selective basis.

In some aspects, all JavaScript code may be written in such a way that any process requiring access to a context-specific state (e.g., a window) may be written to accept a passed argument that provides a handle to this state. Alternatively, all calls to shared code may be executed in the context of a common shared frame (e.g., shared iframe), with each caller passing in its own associated object.

In some aspects, a block iframe diagram corresponding to the prefer buttons 1114.1-3 on the illustrated webpage.com 1104 may be as follows (the prefer buttons 1114.1-3 may be associated with a social network SocialNetwork.com).

[webpage.com [SocialNetwork.com/prefer] [S ocialNetwork.com/prefer] [SocialNetwork.com/prefer]]

In some aspects, each prefer button 1114.1-3 may be associated with two JavaScript files (e.g., child code blocks 1116.1-3), base.js and dependent.js, where dependent.js calls functions from base.js. (In other aspects, any other programming language (e.g., scripting language) code may be used in place of JavaScript code.)

In some examples, the source code for base.js may include the following:

[base.js]
var myVariable=1;
function myFunction( ) {
   var image=document.createElement('img');
   image.src='website.com/?q='+(myVariable++);
   document.body.appendChild(image);
}
window['callThis']=myFunction;

In some examples, the source code for dependent.js may include the following:

[dependent.js]
callThis( );

This code may append to a document an image pointing at a uniform resource locator (URL) constructed from a number. The number may increase each time the function is called.

In some aspects, it may not be desirable to populate the context of webpage.com 1104 with symbol names "myVariable" and "myFunction." (See, for example, FIGS. 1-8 and the related descriptions.) The code may be transformed automatically using, for example, the following source code, where NS refers to a namespace (e.g., namespace 500 or 510):

[basejs]
loadThisCode(function(NS) {
NS.myVariable=1;
NS.myFunction=function( ) {
   var image=document.createElement('img');
   image.src='website.com/?q='+(NS.myVariable++);
   document.body.appendChild(image);
   window['callThis']=NS.myFunction;
});
[dependent.js]
callThis( );

In some aspects, prior to loading the above, a function "loadThisCode" may be set up. The function loadThisCode may know (a) when to execute the code, now enclosed in a function closure, and (b) how to construct the namespace object that passes in. This technique may prevent namespace pollution and provide code execution order guarantees.

In some aspects, a prerequisite to using code in this way is to add a separate, smaller code loader snipped that performs these operations.

In some aspects, dependent.js may not be modified by the code loader. The subject technology man not require that users of code (e.g., programmers) modify their coding style.

In some aspects, base.js and dependent.js may be loaded once, compiled once, and executed three times (once for each prefer button 1114.1-3). A code loader snippet may be responsible for loading the code.

The code loader may ensure that JavaScript (or other programming language, e.g., scripting language, code) is loaded and compiled once, regardless of the number of prefer buttons 1114.1-3.

In some aspects, the top-level code of webpage.com 1104 that draws the prefer buttons 1114.1-3 may also draw a master sharing iframe as follows:

[webpage.com [SocialNetwork.com/MasterIFrame] [SocialNetwork.com/prefer]
[SocialNetwork.com/prefer] [SocialNetwork.com/prefer]]

As a result, when each prefer button 1114.1-3 loads or compiles, its code loader snippet does the following: (1) if the required code has not been loaded or compiled yet, instruct the master iframe to load or compile the code; (2) execute the code in the current iframe context. For example, the source code may appear as follows:

[base.js]
    loadThisCode(function(NS)
    var window=this;
    NS.myVariable=1;
    NS.myFunction=function( ) {
        var image=window.document.createElement('img');
        image.src='website.com/?q='+(NS.myVariable++);
        window.document.body.appendChild(image);
        window['callThis']=NS.myFunction;
    });
    [dependent.js]
    callThis( );

As set forth in the code above, a first transform may explicitly reference the iframe state using the "window" prefix. In JavaScript "window" may be assumed to reference the current lexical scope, typically always the current window object. In fact, dependent.js, which may not participate in code sharing, demonstrates this by calling the method "callThis( )," which may have been exported to the window object.

A second transform may add "var window=this," exemplifying a JavaScript technique that, within the context of the function closure, defines what the "window" variable references. Setting it to keyword "this" allows the code loader snippet to pass in the iframe's window object.

In some aspects, within the iframe, base.js may be loaded as follows:

codeloader.load("base.js");

In the above aspects, codeloader.load may obtain a reference to the function closure ("codeClosure" below) and namespace object ("nsObj") and execute the function closure as:

codeClosure.call(window, nsObj);

As the call may be made in the context of a given prefer button 1114.*k*, "window" may be the iframe's window, and thus may be used in executing the code closure. Dependent.js may remain unmodified.

The approaches described above may work for any JavaScript (or other programming language, e.g., scripting language or compiled language) code and may be based fully on standard language features. As a result, dependent.js may not need to be modified. The approaches described above may be selectively turned on or off. If the master iframe is not available, code may be loaded in the previous, slower fashion (load, compile, and execute each child code block 1116.1-3 once, for a total of n loadings, compilings, and executions, where n is the number of child code blocks 1116.1-3, the number of prefer buttons 1114.1-3, or the number of selected prefer buttons 1114.1-3).

Figure 12:
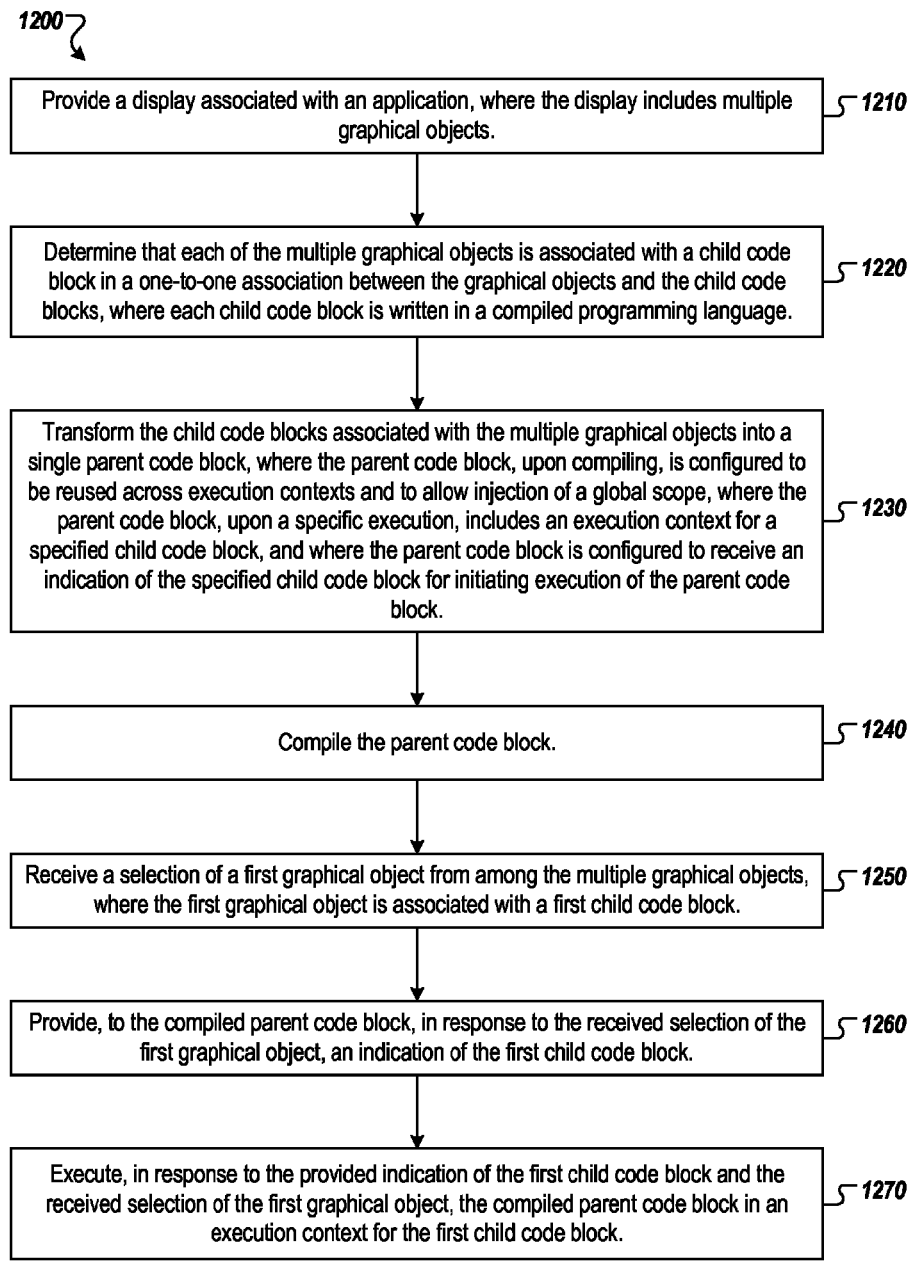
FIG. 12 illustrates an example process by which instructions corresponding to a child code block may be executed via a compiled parent code block.

FIG. 12 illustrates an example process 1200 by which instructions corresponding to a child code block may be executed via a compiled parent code block.

The process 1200 begins at step 1210, where a client computing device (e.g., client computing device 910) provides a display associated with an application (e.g., application 1010). The application may correspond to a web browser, a mobile phone or tablet computer application for displaying data received via a network (e.g., network 920), or any other application. The display includes multiple graphical objects (e.g., multiple prefer buttons 1114.1-3).

In step 1220, the client computing device determines that each of the multiple graphical objects is associated with a child code block (e.g., one of child code blocks 1116.1-3) in a one-to-one association between the graphical objects and the child code blocks. Each child code block is written in a programming language. The programming language may be a scripting language (e.g., JavaScript, VBScript, or Dart), a compiled language, or any other programming language, for example, a programming language used for mobile phone or tablet computer applications. The programming language may be associated with single threaded compiling or configured for single threaded compiling. As a result of the single threaded compiling, compiling the child code blocks may be a costly operation. Alternatively, the programming language may be associated with multithreaded compiling or configured for multithreaded compiling.

In some aspects, the display is a webpage (e.g., a webpage displayed in webpage display region 1106) displayed via a web browser application. The child code blocks may be associated with the webpage. For example, the child code blocks may be received, via the network, in conjunction with the data (e.g., display data) for the webpage. The graphical objects may be displayed within the webpage. Each graphical object may be associated with an inline frame (iframe) within the webpage in a one-to-one association between graphical objects and inline frames. In other words, each graphical object may have its own inline frame.

In some aspects, each child code block (e.g., child code block 1116.*k*) includes the same base library and/or overlapping code (with the other child code blocks) and includes code for taking one or more actions (e.g., sharing or indicating a preference via a social network) on an associated object (e.g., content item 1108.*k*). The one or more actions are identical (e.g., each and every action corresponds to preferring a content item via a social network) or similar (e.g., some action(s) correspond to preferring a content item via a social network, while other action(s) correspond to sharing a content item via the social network) for each and every one of the child code blocks. However, each of the associated objects is associated with the child code blocks in a one-to-one association between associated objects and child code blocks. In other words, each child code block 1116.*k* may be associated with an associated object 1108.*k* that is separate and distinct from the associated object(s) for each other child code block(s). The same base library and/or overlapping code may include function(s) that are shared by the child code blocks.

In step 1230, the client computing device transforms the child code blocks associated with the multiple graphical objects into a single parent code block (e.g., parent code block 1118). The parent code block, upon compiling, is configured to be reused across execution contexts (e.g., execution contexts associated with child code blocks) and to allow injection of a global scope (e.g., represented via a window object). The parent code block, upon a specific execution, includes the same base library and/or the overlapping code of the child code blocks. The parent code block includes an execution context for a specified child code block. The parent code block is configured to receive an indication of the specified child code block for initiating execution of the parent code block.

The indication of the specified child code block may be, for example, the associated object of the specified child code block or a pointer to the associated object of the specified child code block. Alternatively, the indication of the specified child code block may be a pointer to any data associated with the specified child code block or a pointer to the specified child code block itself.

In step 1240, the client computing device compiles the parent code block. In some aspects, upon completion of compiling the parent code block, the parent code block is configured to undergo one or multiple executions. Each execution is within a context of the specified child code block of which the indication is received. Advantageously, code for multiple child code blocks may be compiled once in compiling the parent code block, saving compile time, memory, and/or processor availability and reducing the compile time of the application. In some aspects, a single thread is used for compiling code blocks (e.g., parent code block(s) or child code block(s)) in the programming language, and time may be saved by compiling a single parent code block rather than multiple child code blocks.

In step 1250, the client computing device receives a selection of a first graphical object from among multiple graphical objects. The first graphical object is associated with a first child code block. The selection of the first graphical object may be received, for example, from a user, via operation of a mouse or a touch screen.

In step 1260, the client computing device provides, to the compiled parent code block, in response to the received selection of the first graphical object, an indication of the first child code block. The indication of the first child code block may correspond to any of the indication(s) of the specified child code block, as set forth above.

In step 1270, the client computing device executes, in response to the provided indication of the first child code block and the received selection of the graphical object, the compiled parent code block in an execution context for the first child code block. Executing the compiled parent code block in an execution context for the first child code block may include taking one or more actions on an associated object of the first child code block.

In one example, the first child code block (e.g., child code block 1116.*k*) includes code for sharing or indicating a preference for a content item (e.g., content item 1108.*k*) via a social network, and the associated object is the content item. The one or more actions may correspond to sharing or indicating the preference via the social network. After step 1270, the process 1200 ends.

In some aspects, instructions for implementing the steps 1210-1270 in the process 1200 may be stored in a memory of a computer (e.g., client computing device 910) and may be implemented by the computer. The steps 1210-1270 in the process 1200 may be carried out in series. Alternatively, two or more of the steps 1210-1270 in the process 1200 may be carried out in parallel. The steps 1210-1270 in the process 1200 may be carried out in the order set forth herein or in any other order.

One objective of some aspects of the subject technology is to only download, parse, and/or compile scripting language (e.g., JavaScript) or other programming language code for widgets (e.g., graphical objects associated with code, buttons, or HTML elements) exactly once per application display (e.g., webpage) independently of the number of widgets rendered in the application display. The change(s) associated with the subject technology may be minimally invasive with respect to the current rendering model but forward compatible with future shared rendering model(s).

In some aspects, a scripting language (e.g., JavaScript) loader iframe may be added to every application display (e.g., webpage). Widget(s) may delegate scripting language code loading and/or compiling to this iframe. Scripting language payloads may be kept alive and reused across widgets by re-executing the callback-style payloads within the context of a given iframe that requires and/or requests the payload.

The module server may be changed to prefix every (including incremental loads) scripting language payload that contains a /cb=/JavaScript callback parameter (or a similar parameter in another scripting language) with a prelude similar to the code below in JavaScript that creates a lexical context that overrides the default global JavaScript context.
   var window=this;

In some aspects, the RescopeGlobalSymbols JavaScript compiler pass is updated to prefix every external reference with "window," making them explicitly dependent on the injected context. By applying this change after running the AliasExternals pass, the actual effect on the code size may, in some cases, be minimal. In some aspects, both the changes to Module Server and the JavaScript compiler described herein are fully backward compatible and independent of each other.

In some aspects, the JavaScript loader iframe (or a similar frame in another scripting language or programming language) is sibling to all widget iframes and lives on the same origin as the widgets. The JavaScript loader iframe (or the similar frame in another scripting language or programming language) may have one or more of the following properties: (a) infinitely cached; (b) cache busted with checksum of the parent loader (so it changes every time the parent loader changes); (c) includes an inline gapi loader; (d) has a well-known name; (e) receives the parent hint via a jsh parameter; (f) starts downloading the provided list of initial features (provided, for example, via a uniform resource locator fragment) in real-time; and (g) only one JavaScript loader iframe is created. As used herein, real-time may refer to within one hour, within ten minutes, within one minute, within ten seconds, within one second, etc., as determined, for example, based on a processing speed of one or more computers or a network speed. An operation may be completed in real-time if the operation is completed without any intentional delay (however, the operation may be delayed unintentionally due to lack of processor or network resources). The uniform resource locator (URL) fragment may be, for example:
   /js/loader/:checksumOfParentLoader/
      frame.html#features=:features&jsh=XXX In some aspects, widgets load the initial programming language or scripting language (e.g., JavaScript) code through gapi.load or an underlying mechanism based on gapi.load that is not widget specific. The widget loading mechanism may be called, for example, loadJs. In some examples, script tags in widgets may be replaced with the following JavaScript code:
   var loader=parent.frames[$WellKnownControllerIFrameName];
   if (loader) {
      loader.loadJs=loader.loadJs||[ ];
      loaderloadJs.push([$ScriptUrl, window]);
   } else { // Or possibly in case of an exception
      document.write('<script     src="'"$ScriptUrl'"></script>');

The above code may be used in conjunction with an assumption that, in the wide number of cases, the JavaScript loader iframe loads before the widget(s) on the webpage or application display. In this case, the call to loadJs.push may be a synchronous call to an underlying script loader.

Should the underlying script loader not exist, the subject technology may fall back to the script based loader. Some applications (e.g., the web browser Chrome) support adding properties to an iframe window before the iframe is loaded, so there is no race condition whetn the loader iframe loads late. Some applications (e.g., the web browser Opera) may fall back to this parent webpage when the parent webpage is on secure socket layer (SSL). In some aspects, $WellKnownControllerlFrameName may be overridable through a query fragment name.

In some aspects, as long as all widgets use disjoint or disjunct code, multiple widgets may be supported using the same loader iframe. If two distinct widgets use the same code, negative loading may lead to undesired execution of unrelated initialization code in the context of a given widget. Initialization code may have to be adapted to detect whether code from a given widget should be run in a given context.

In some aspects, code may be preloaded. If the client computing device knows which widgets are being injected into a given application or webpage (e.g., data representing the widgets may be passed as a fragment parameter), the loader iframe may start downloading programming language or scripting language code (e.g., JavaScript code) for the widgets in real-time as opposed to waiting until the widget requests the JavaScript code.

In some aspects, widgets may call gapi.load to do late loading. The call may be transparently handled by the loader iframe. In some aspects, widgets may late load programming language or scripting language code using any mechanism. Some widgets may be unaware of the loadJs system described above. In some aspects, the code loaded from those widgets may not be shared. In other aspects, the code loaded from those widgets may be shared. Loaders may be made aware of loadJs.

In some aspects, the code sharing described herein enables code sharing across different widget types (e.g., code sharing between prefer button(s) for indicating a preference for content via a social network and share button(s) for sharing content via the social network).

One of the tradeoffs of the negative loading model is that the loader cannot know which subset of loaded modules are actually relevant for a given widget. Thus, any widget may get all of the code that was requested before the widget started requesting code. The above may be a problem if code is not side effect free (beyond providing namespaces). Relevant side effects may include: (a) static initializers; and (b) initialization code like used by the prefer button—a final module that sets up the widget logic.

In some aspects, to participate in cross widget code sharing, widgets may need to be converted to a form where initializers are only executed from code payload callbacks, as opposed to being part of the payload itself.

In some aspects, advantages of cross-widget code sharing may include potential reduction of programming language or scripting language payloads for widgets that are loaded, parsed, or compiled after the first one.

In some aspects, disadvantages include that cacheability may be reduced because, depending on the load order, uniform resource locators may differ per-page. While this disadvantage may exist for late-loading in the single widget type case, the problem may be amplified if load order depends on widget load order, which is non-deterministic (this could be worked around with through preloading the loader iframe).

In some aspects, widgets may opt-out of cross-widget code sharing. The opting out may be implemented, for example, by creating code-domains for a widget. The opting out may be necessary if applicable widgets do not share their code with other widgets.

In some aspects, in some applications (e.g., the web browser Internet Explorer Version 8), the subject technology may cause memory leaks due to inter-frame cycle dependencies.

In some aspects, the subject technology may include code block loading closures during the whole page life cycle. This may be expensive in terms of memory. In some implementations, code block loading closures may be destroyed, for example, after 1-5 seconds. This may optimize the case where loads happen in short order, but do not hurt memory usage in the long term.

In some aspects, a compiler pass may be used to test whether assumptions in the code regarding symbols which have to be aliased are correct.

In some aspects, an application (e.g., a webpage) may include a prefer button for indicating a preference for content via a social network and a share button for sharing content via the social network. The prefer button may have a corresponding child code block 1116.k and the share button may have a corresponding child code block 1116.k. The prefer button and the share button may be associated with some common or overlapping code (e.g., code implemented by both the prefer button and the share button) and some distinct code (e.g., code implemented by the prefer button and not by the share button or code implemented by the share button and not by the prefer button). In some aspects, the common or overlapping code corresponds to the parent code block 1118. In some aspects, the distinct code does not correspond to the parent code block 1118. The common or overlapping code may be compiled when the parent code block 1118 is compiled, while the distinct code may be compiled separately for each child code block (e.g., when the child code block is loaded or when a button corresponding to the child code block is selected).

In some aspect, a global scope may be injected into a functional closure. For example, a window object (e.g., corresponding to a parent code block) may be passed into a function (e.g., a child code block). The window object may represent a global scope, including global elements, for example precompiled functions (e.g., a precompiled base library or precompiled overlapping code). The window object may be bound to an execution context. The execution context may correspond to the function (e.g., the child code block). The window object may include a pointer to the function.

The subject technology is described above in conjunction with code written in a scripting language (for example, JavaScript). However, the subject technology may be used with any other programming language. For example, in some aspects, the subject technology may be used to optimize applications on a mobile phone (e.g., an iPhone® or an Android® phone) or a tablet computer (e.g., an iPad® or Android® tablet).

Figure 13:
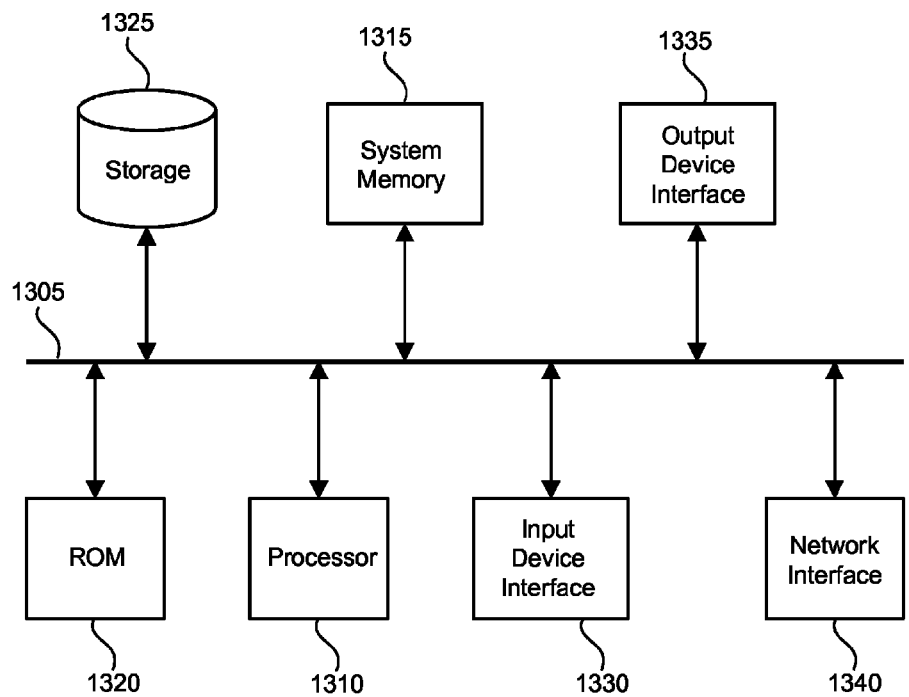
FIG. 13 conceptually illustrates an example electronic system with which some implementations of the subject technology are implemented.

FIG. 13 conceptually illustrates an electronic system 1300 with which some implementations of the subject technology are implemented. For example, one or more of the user device 620, the server 650, the module server 660, the client computing device 910, or the server 930 may be implemented using the arrangement of the electronic system 1300. The electronic system 1300 can be a computer (e.g., a mobile phone, PDA), or any other sort of electronic device. Such an electronic system includes various types of computer readable media and interfaces for various other types of computer readable media. Electronic system 1300 includes a bus 1305, processing unit(s) 1310, a system memory 1315, a read-only memory 1320, a permanent storage device 1325, an input device interface 1330, an output device interface 1335, and a network interface 1340.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1320, the system memory 1315, and the permanent storage device 1325.

From these various memory units, the processing unit(s) 1310 retrieves instructions to execute and data to process in order to execute the processes of the subject technology. The processing unit(s) can be a single processor or a multi-core processor in different implementations.

The read-only-memory (ROM) 1320 stores static data and instructions that are needed by the processing unit(s) 1310 and other modules of the electronic system. The permanent storage device 1325, on the other hand, is a read-and-write memory device. This device is a non-volatile memory unit that stores instructions and data even when the electronic system 1300 is off. Some implementations of the subject technology use a mass-storage device (for example a magnetic or optical disk and its corresponding disk drive) as the permanent storage device 1325.

Other implementations use a removable storage device (for example a floppy disk, flash drive, and its corresponding disk drive) as the permanent storage device 1325. Like the permanent storage device 1325, the system memory 1315 is a read-and-write memory device. However, unlike storage device 1325, the system memory 1315 is a volatile read-and-write memory, such a random access memory. The system memory 1315 stores some of the instructions and data that the processor needs at runtime. In some implementations, the processes of the subject technology are stored in the system memory 1315, the permanent storage device 1325, or the read-only memory 1320. For example, the various memory units include instructions for executing multiple child code blocks via a single compiled parent code block in accordance with some implementations. From these various memory units, the processing unit(s) 1310 retrieves instructions to execute and data to process in order to execute the processes of some implementations.

The bus 1305 also connects to the input and output device interfaces 1330 and 1335. The input device interface 1330 enables the user to communicate information and select commands to the electronic system. Input devices used with input device interface 1330 include, for example, alphanumeric keyboards and pointing devices (also called "cursor control devices"). Output device interfaces 1335 enables, for example, the display of images generated by the electronic system 1300. Output devices used with output device interface 1335 include, for example, printers and display devices, for example cathode ray tubes (CRT) or liquid crystal displays (LCD). Some implementations include devices for example a touchscreen that functions as both input and output devices.

Finally, as shown in FIG. 13, bus 1305 also couples electronic system 1300 to a network (not shown) through a network interface 1340. In this manner, the electronic system 1300 can be a part of a network of computers (for example a local area network ("LAN"), a wide area network ("WAN"), or an Intranet, or a network of networks, for example the Internet. Any or all components of electronic system 1300 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for compiling one or more code blocks written in a programming language, the method comprising:
   providing a display associated with an application, wherein the display comprises a plurality of graphical objects;
   determining that each of the plurality of graphical objects is associated with a child code block in a one-to-one association between the graphical objects and the child code blocks, wherein each child code block is written in a programming language;
   transforming the child code blocks associated with the plurality of graphical objects into a single parent code block, wherein the parent code block, upon compiling, is configured to be reused across execution contexts and to allow injection of a global scope, wherein the parent code block, upon a specific execution, comprises an execution context for a specified child code block, and wherein the parent code block is configured to receive an indication of the specified child code block for initiating execution of the parent code block; and
   compiling the parent code block.

2. The method of claim 1, wherein each child code block shares an identical base library or overlapping code with each other child code block, and wherein the identical base library or overlapping code comprises one or more functions.

3. The method of claim 1, wherein each child code block comprises code for taking one or more actions on an associated object, wherein the one or more actions are identical for each and every one of the child code blocks, and wherein each of the associated objects is associated with the child code blocks in a one-to-one association between associated objects and child code blocks.

4. The method of claim 3, wherein the indication of the specified child code block comprises the associated object of the specified child code block.

5. The method of claim 3, wherein the indication of the specified child code block comprises a pointer to the associated object of the specified child code block.

6. The method of claim 1, further comprising:
receiving a selection of a first graphical object from among the plurality of graphical objects, wherein the first graphical object is associated with a first child code block;
providing, to the compiled parent code block, in response to the received selection of the first graphical object, an indication of the first child code block; and
executing, in response to the provided indication of the first child code block and the received selection of the first graphical object, the compiled parent code block in an execution context for the first child code block.

7. The method of claim 1, wherein, upon completion of compiling the parent code block, the parent code block is configured to undergo one or more executions, wherein each execution is within a context of the specified child code block of which the indication is received.

8. The method of claim 1, wherein the indication of the specified child code block comprises a pointer to data associated with the specified child code block.

9. The method of claim 1, wherein the application comprises a web browser.

10. The method of claim 9, wherein the display comprises a webpage displayed via the web browser, and wherein the child code blocks are associated with the webpage.

11. The method of claim 10, wherein each graphical object is associated with an inline frame (iframe) within the webpage in a one-to-one association between graphical objects and inline frames.

12. The method of claim 1, wherein a first graphical object in the plurality of graphical objects corresponds to a button or a hypertext markup language (HTML) element for indicating preference for content via a social network, and wherein a second graphical object in the plurality of graphical objects corresponds to a button or HTML element for sharing content via the social network.

13. The method of claim 12, wherein the first graphical object is associated with a first child code block, wherein the second graphical object is associated with a second child code block, and wherein code corresponding to the first child code block and code corresponding to the second child code block exhibit different behavior when executed.

14. The method of claim 1, wherein the programming language is associated with single threaded compiling.

15. The method of claim 1, wherein the programming language is JavaScript, wherein the parent code block comprises a window object representing the global scope, and wherein the window object configured to inject the global scope into the specified child code block.

16. A machine-readable medium encoded with executable instructions for preparing for compiling of one or more code blocks written in a programming language, the instructions comprising code for:
determining that each of a plurality of graphical objects is associated with a child code block in a one-to-one association between the graphical objects and the child code blocks, wherein each child code block is written in a programming language, and wherein the plurality of graphical objects are displayed within a window of an application; and
transforming the child code blocks associated with the plurality of graphical objects into a single parent code block, wherein the parent code block, upon compiling, is configured to be reused across execution contexts and to allow injection of a global scope, wherein the parent code block, upon a specific execution, comprises an execution context for a specified child code block, and wherein the parent code block is configured to receive an indication of the specified child code block for initiating execution of the parent code block.

17. The machine-readable medium of claim 16, wherein each child code block shares an identical base library or overlapping code with each other child code block, and wherein the identical base library or overlapping code comprises one or more functions or one or more variables.

18. The machine-readable medium of claim 16, wherein each child code block comprises code for taking one or more actions on an associated object, wherein the one or more actions are identical for each and every one of the child code blocks, and wherein each of the associated objects is associated with the child code blocks in a one-to-one association between associated objects and child code blocks.

19. The machine-readable medium of claim 18, wherein the indication of the specified child code block comprises the associated object of the specified child code block.

20. The machine-readable medium of claim 18, wherein the indication of the specified child code block comprises a pointer to the associated object of the specified child code block.

21. The machine-readable medium of claim 18, wherein the instructions further comprise code for:
compiling the parent code block.

22. The machine-readable medium of claim 21, wherein the instructions further comprise code for:
receiving a selection of a first graphical object from among the plurality of graphical objects, wherein the first graphical object is associated with a first child code block;
providing, to the compiled parent code block, in response to the received selection of the first graphical object, an indication of the first child code block; and
executing, in response to the provided indication of the first child code block and the received selection of the first graphical object, the compiled parent code block in an execution context for the first child code block.

23. The machine-readable medium of claim 22, wherein the instructions for executing the compiled parent code block in the execution context for the first child code block comprise code for:
taking the one or more actions an associated object of the first child code block.

24. A system for compiling one or more modules written in a programming language, the system comprising:
one or more processors; and
a memory comprising instructions which, when executed by the one or more processors, cause the one or more processors to:
provide a display associated with an application, wherein the display comprises a plurality of graphical objects;
determine that each of the plurality of graphical objects is associated with a child code block in a one-to-one association between the graphical objects and the child code blocks, wherein each child code block is written in a programming language, wherein each child code block shares an identical base library or overlapping code with each other child code block, and wherein the identical base library or overlapping code comprises one or more functions;
transform the child code blocks associated with the plurality of graphical objects into a single parent code block, wherein the parent code block, upon compiling, is configured to be reused across execution contexts and to allow injection of a global scope, wherein the parent code block, upon a specific execution, comprises an execution context for a specified child code block, and wherein the parent code block is configured to receive an indication of the specified child code block for initiating execution of the parent code block; and compile the parent code block.

25. The system of claim 24, wherein the programming language comprises a scripting language.

26. The system of claim 24, wherein the programming language comprises a compiled language.

* * * * *